United States Patent
Karatsu et al.

(10) Patent No.: US 10,608,211 B2
(45) Date of Patent: Mar. 31, 2020

(54) OUTER CASING MATERIAL FOR BATTERY AND LITHIUM SECONDARY BATTERY

(71) Applicant: SHOWA DENKO PACKAGING CO., LTD., Isehara-shi, Kanagawa-ken (JP)

(72) Inventors: Makoto Karatsu, Hikone (JP);
Kensuke Nagata, Hikone (JP);
Tetsunobu Kuramoto, Hikone (JP)

(73) Assignee: SHOWA DENKO PACKAGING CO., LTD., Isehara-Shi (JP)

( * ) Notice: Subject to any disclaimer, the term of this patent is extended or adjusted under 35 U.S.C. 154(b) by 96 days.

(21) Appl. No.: 13/754,310

(22) Filed: Jan. 30, 2013

(65) Prior Publication Data

US 2013/0196215 A1  Aug. 1, 2013

(30) Foreign Application Priority Data

Jan. 31, 2012 (JP) ................. 2012-019034

(51) Int. Cl.
*H01M 2/02* (2006.01)
*H01M 10/052* (2010.01)

(52) U.S. Cl.
CPC ........ *H01M 2/0287* (2013.01); *H01M 10/052* (2013.01)

(58) Field of Classification Search
CPC .................................................. H01M 2/0287

(Continued)

(56) References Cited

U.S. PATENT DOCUMENTS

2002/0127362 A1\* 9/2002 Jansen ...................... B32B 3/02
428/40.1
2002/0160212 A1\* 10/2002 Yamashita ................ B32B 7/12
428/458

(Continued)

FOREIGN PATENT DOCUMENTS

CN   1693154 A   11/2005
JP   8-283360 A   10/1996

(Continued)

OTHER PUBLICATIONS

Machine translation of JP-2004027212-A, Satsuba, Japan, Jan. 2004 (Year: 2004).\*

(Continued)

*Primary Examiner* — Sarah A. Slifka
*Assistant Examiner* — Brent C Thomas
(74) *Attorney, Agent, or Firm* — Mori & Ward, LLP

(57) ABSTRACT

An outer casing material for a battery 4 is provided, wherein an outer layer 11, a metal foil layer 10 and an inner layer 8 are laminated via an adhesive layer 5; the inner layer 8 comprises a sealant layer 8*b* and a base material layer 8*a*; the sealant layer 8*b* is made from a propylene-ethylene random copolymer wherein a melt flow rate at 230° C. thereof is in a range of 3 to 30 g/10 minutes; the base material layer 8*a* is made of a resin composition wherein a melt flow rate at 230° C. thereof is in a range of 0.1 to 15 g/10 minutes, xylene-soluble component Xs thereof satisfies the predetermined conditions, and the resin composition comprises 50 to 80% by mass of a propylene component (A) and 50 to 20% by mass of a copolymer component (B) which is an elastomer of a copolymer of propylene and ethylene and/or α-olefin having 4 to 12 carbons and includes 50 to 85% by mass of a polymerization unit originated from propylene.

21 Claims, 7 Drawing Sheets

(58) Field of Classification Search
USPC .......................................................... 429/176
See application file for complete search history.

(56) References Cited

U.S. PATENT DOCUMENTS

| | | | | |
|---|---|---|---|---|
| 2003/0180609 | A1* | 9/2003 | Yamashita | H01M 2/021 |
| | | | | 429/185 |
| 2005/0136324 | A1* | 6/2005 | Yamada et al. | 429/175 |
| 2006/0030652 | A1 | 2/2006 | Adams et al. | |
| 2007/0196732 | A1* | 8/2007 | Tatebayashi | H01M 2/22 |
| | | | | 429/181 |
| 2009/0065055 | A1* | 3/2009 | Fujii | B32B 27/20 |
| | | | | 136/259 |
| 2011/0023945 | A1* | 2/2011 | Hayashi | C09D 127/08 |
| | | | | 136/251 |
| 2011/0212361 | A1* | 9/2011 | Kim et al. | 429/176 |
| 2012/0028014 | A1* | 2/2012 | Koehn et al. | 428/213 |

FOREIGN PATENT DOCUMENTS

| | | | | |
|---|---|---|---|---|
| JP | 2001-030407 | A | | 2/2001 |
| JP | 2001-035453 | A | | 2/2001 |
| JP | 2001-035454 | A | | 2/2001 |
| JP | 2002-319376 | A | | 10/2002 |
| JP | 2003-007261 | A | | 1/2003 |
| JP | 2003-288865 | A | | 10/2003 |
| JP | 2004-27212 | A | | 1/2004 |
| JP | 2004-027218 | A | | 1/2004 |
| JP | 2004027212 | A | * 1/2004 | ............... C08J 5/18 |
| JP | 2004-111069 | A | | 4/2004 |
| JP | 2005-116322 | A | | 4/2005 |
| JP | 2006-066113 | A | | 3/2006 |
| JP | 2006-134692 | A | | 5/2006 |
| JP | 2006-326925 | A | | 12/2006 |
| JP | 2007-273398 | A | | 10/2007 |
| JP | 2007-294380 | A | | 11/2007 |
| JP | 2008-243439 | A | | 10/2008 |
| JP | 4431822 | B2 | | 3/2010 |
| JP | 2012-014915 | A | | 1/2012 |
| TW | 200607154 | A | | 2/2006 |

OTHER PUBLICATIONS

H. N. Cheng, "C-NMR Sequence Determination for Multicomponent Polymer Mixtures", Journal of Applied Polymer Science, 1988, pp. 1639-1650, vol. 35.

C. J. Carman, et al. "Monomer Sequence Distribution in Ethylene-Propylene Rubber Measured by C NMR. 3. Use of Reaction Probability Model", Macromolecules, 1977, pp. 536-544, vol. 10.

Communication dated Aug. 25, 2015 from the Japanese Patent Office in counterpart application No. 2012-019034.

Communication dated Sep. 28, 2015 from the State Intellectual Property Office of the People's Republic of China in counterpart application No. 201310034797.2.

Communication (Notice of Allowance) dated May 9, 2017 from the Japanese Patent Office in counterpart application No. 2012-019034.

Actual knowledge of the packaging material second edition, Jan. 30, 1992 Japan Packaging Institute, Toyo Keizai Inc. (4 pages total).

Communication (Notice of Allowance) dated Jun. 28, 2016, from the Taiwanese Intellectual Property Office in counterpart Taiwanese application No. 102103499.

* cited by examiner

OUTER CASING MATERIAL FOR BATTERY AND LITHIUM SECONDARY BATTERY

BACKGROUND OF THE INVENTION

Field of the Invention

The present invention relates to an outer casing material for a battery and a lithium secondary battery.

Description of Related Art

Recently, a lithium secondary battery has become widely used for power sources of electronic equipment such as video cameras, mobile phones and laptop personal computers, and for an in-vehicle power supply of an electric or hybrid vehicle.

There is a limit to a mounting space for an in-vehicle power supply in a vehicle and the shape of the mounting space is not constant. For this reason, similarly to the case of the electronic apparatus or the like, freedom of shape, size reduction (a reduction in thickness) and reduction in weight are required for an in-vehicle lithium secondary battery.

As an outer casing material of such a lithium secondary battery, for example, a packaging container as described in Patent Literature 1 shown below is known. In Patent Literature 1, a packaging container is described which includes an outer layer made of a resin layer, aluminum foil and an inner layer made of a resin layer, and heat-sealing properties are given to the resin layer of the inner layer.

By inserting a cell into such a packaging container and heat-sealing the inner layers, a lithium secondary battery having an excellent degree of freedom of shape and hermetic sealing properties is obtained.

Further, an in-vehicle lithium secondary battery has a large size compared to a lithium secondary battery for an electronic apparatus and the amount of current used is large. Accordingly, excellent insulation performance is required for an outer casing material of the in-vehicle lithium secondary battery.

In Patent Literature 2 shown below, an abnormality detection device of a battery which detects defects of an insulating layer of a battery outer casing material is disclosed.

Furthermore, in Patent Literature 3, a battery packaging material is disclosed which has moisture resistance and content resistance, can be used for a battery including a liquid or solid organic electrolyte (macromolecular polyelectrolyte) or used for a fuel cell, a capacitor, or the like, and does not cause shortstop between a lead wire and a barrier layer of an outer casing.

Concretely, a battery packaging material, which forms an outer casing of a battery by inserting a cell body into the packaging material and sealing peripheral portions of the material by heat-sealing, is disclosed. The packaging material is a laminate which includes at least a base material layer, an adhesive layer, a barrier layer, a resin adhesive layer and a sealant layer; at least the sealant layer consists of a low fluidity polypropylene layer, which hardly collapses by pressure and heat of heat sealing, and a high fluidity polypropylene layer, which easily collapses; and the high fluidity polypropylene layer is provided as the most inner layer thereof.

Furthermore, in Patent Literature 4, a battery packaging material is disclosed wherein at least a base material layer, a metal foil layer which includes a chemically treated layer on at least one surface thereof, an acid-modified polyolefin layer and a heat-sealing layer composed of a high melting point polypropylene layer and an ethylene-propylene random copolymer layer are at least laminated in this order. Concretely, a battery packaging material is disclosed wherein the high melting point polypropylene layer is provided to the side which is nearer to the metal foil layer than the ethylene-propylene random copolymer, and the high melting point polypropylene layer has a melting point of 150° C. or more.

Furthermore, in Patent Literature 5, a packaging material is disclosed which is a laminate including at least a base material layer, an adhesive layer 1, aluminum, a chemical conversion treatment layer, an adhesive layer 2 and a multilayered sealant layer. The sealant layer is formed by coextruding polyolefin and acid-modified polyolefin to form a film and performing cross-linking treatment so that a gel fraction thereof is set to 0.5% to 80%.

PRIOR ART DOCUMENTS LITERATURE

Patent Literature

Patent Literature 1: Japanese Patent No. 4431822
Patent Literature 2: Japanese Unexamined Patent Application, First Publication No. 2008-243439
Patent Literature 3: Japanese Unexamined Patent Application, First Publication No. 2003-7261
Patent Literature 4: Japanese Unexamined Patent Application, First Publication No. 2007-273398
Patent Literature 5: Japanese Unexamined Patent Application, First Publication No. 2002-319376

SUMMARY OF THE INVENTION

Problems to be Solved by the Invention

However, the insulation performance of conventional outer casing materials for a battery is still insufficient and further improvement has been required. Concretely, techniques described in Patent Literatures 3 and 4 do not always achieve sufficient insulation performance, since a low fluidity polypropylene layer of Patent Literature 3 and a high melting point polypropylene layer of Patent Literature 4 exist near to a heat source used for heat-sealing. Furthermore, in a technique described in Patent Literature 5, when a sealant layer is made from a cross-linked polypropylene-based material, it is technically difficult to cross-link the polypropylene-based material, there is a case that sufficient insulation performance cannot be obtained, and cost tends to increase.

The present invention has been made in view of the aforementioned circumstances and has an object of providing an outer casing material for a battery having excellent insulation properties and a lithium secondary battery provided with the outer casing material for a battery.

Means to Solve the Problems (1) An outer casing material for a battery, wherein
the casing material is formed by laminating, via an adhesive layer, an outer layer which is a heat-resistant resin film, a metal foil layer and an inner layer which is a thermoplastic resin film;
the inner layer comprises at least a sealant layer and a base material layer, wherein the sealant layer of the inner layer is positioned as a surface on the opposite side to the metal foil layer;
the sealant layer is made from a propylene-ethylene random copolymer wherein a melt flow rate at 230° C. thereof is in a range of 3 to 30 g/10 minutes;

the base material layer is made of a resin composition wherein a melt flow rate at 230° C. thereof is in a range of 0.1 to 15 g/10 minutes and a xylene-soluble component Xs thereof satisfies the following (I) to (V) and the resin composition comprises 50 to 80% by mass of a propylene component (A) and 50 to 20% by mass of a copolymer component (B), which is an elastomer of a copolymer of propylene and ethylene and/or α-olefin having 4 to 12 carbons and includes 50 to 85% by mass of a polymerization unit originating from propylene;

(I) propylene content Fp is 50 to 80% by mass, (II) limiting viscosity [η] of the xylene-soluble component Xs is 1.4 to 5.0 dL/g, (III) a ratio (Xs/Xi) of limiting viscosity [η] of the xylene-soluble component Xs and limiting viscosity [η] of the xylene-insoluble component Xi is 0.7 to 1.5, (IV) propylene content (Pp) of a high propylene content component is greater than or equal to 60% by mass and less than 95% by mass, and propylene content (P'p) of a low propylene content component is greater than or equal to 20% by mass and less than 60% by mass, wherein the contents are defined by a 2-site model, and (V) a ratio (Pp/P'p) of the propylene content (Pp) of the high propylene content component and the propylene content (P'p) of the low propylene content component, which are defined by a 2-site model, satisfies formula (1) shown below, and a ratio (Pf1) of the high propylene content component and a ratio (1−Pf1) of the low propylene content component, which are based on the propylene content Fp of the xylene-soluble component Xs, satisfy formula (2) shown below, $$Pp/P'p \geq 1.90 \quad (1)$$

$$2.00 < Pf1/(1-Pf1) < 6.00 \quad (2).$$

(2) The outer casing material for a battery described in (1), wherein the propylene content Fp of the xylene-soluble component Xs is in a range of 60 to 80% by mass.

(3) The outer casing material for a battery described in (1) or (2), wherein the refractive index of the xylene-insoluble component Xi is 1.490 to 1.510, and the refractive index of the xylene-soluble component Xs is in a range of 1.470 to 1.490.

(4) The outer casing material for a battery described in any one of (1) to (3), wherein the inner layer is a thermoplastic resin film which is generated by a T-die molding method or inflation molding method.

(5) The outer casing material for a battery described in any one of (1) to (4), wherein a melt flow rate at 230° C. of the sealant layer is in a range of 5 to 25 g/10 minutes.

(6) The outer casing material for a battery described in any one of (1) to (5), wherein the thickness of the inner layer is in a range of 20 to 100 μm.

(7) The outer casing material for a battery described in any one of (1) to (6), wherein the outer layer, the metal foil layer and the inner layer are laminated via a dry-lamination type adhesive layer.

(8) The outer casing material for a battery described in any one of (1) to (7), wherein the outer casing material includes a concave portion formed by deep-drawing or bulging.

(9) A lithium secondary battery which has the outer casing material for a battery described in any one of (1) to (8).

Effects of the Invention

According to the present invention, an outer casing material for a battery which is excellent in insulation performance can be obtained. Furthermore, a lithium secondary battery of the present invention includes the outer casing material for a battery excellent in insulation performance, and therefore, the lithium secondary battery can be preferably used as an in-vehicle type wherein power consumption is large.

DETAILED DESCRIPTION OF THE INVENTION

Hereinafter, preferred examples of the present invention will be described below. However, the present invention is not limited to these examples. Addition, omission, substitution and other changes to a configuration can be made within a scope which does not depart from the gist of the present invention. The present invention is not limited by the following description, but is limited only by the scope of the appended claims.

Hereinafter, a description will be made using figures with respect to an outer casing material for a battery and a lithium secondary battery which are preferred embodiments of the invention.

Figure 1:
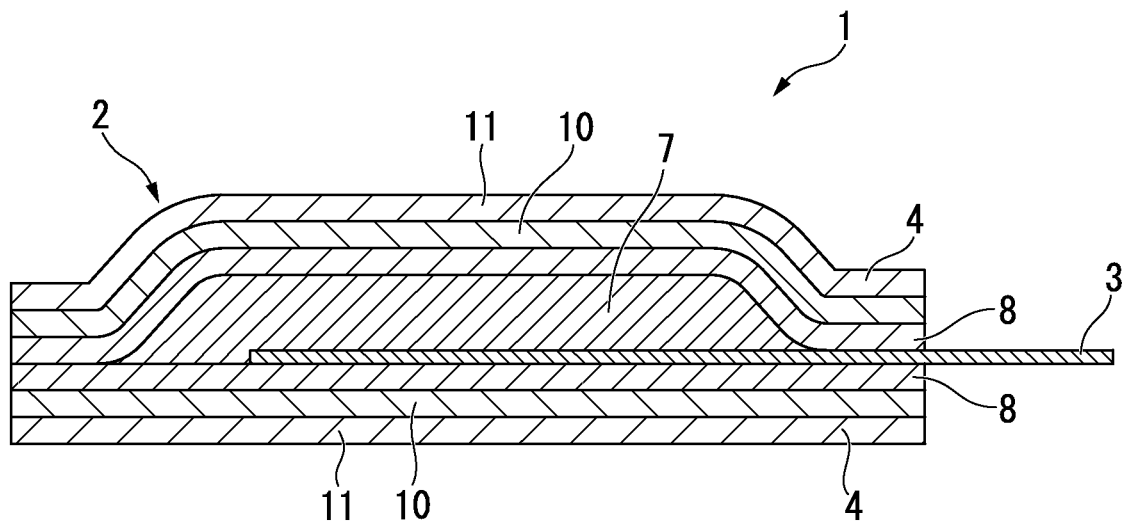
FIG. 1 is a cross-sectional view of an example of a lithium secondary battery of the present invention.

FIG. 1 is a cross-sectional view illustrating an example of a lithium secondary battery of the present invention.

Figure 2:
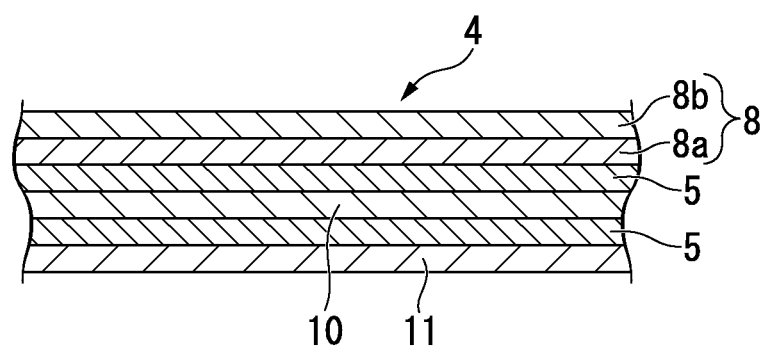
FIG. 2 is an enlarged view wherein a part of a lithium secondary battery of the present invention is enlarged, and is a cross-sectional view which shows an example of an outer casing material for a battery equipped in the lithium secondary battery.

FIG. 2 is an enlarged view wherein a part of a lithium secondary battery of the present invention is enlarged, and is a cross-sectional view which shows an example of an outer casing material for a battery which is equipped in the lithium secondary battery.

A lithium secondary battery 1 shown in FIG. 1 is constituted to include a positive electrode (not shown), a negative electrode (not shown), an electrolyte 7 and an outer casing body for a battery 2 which packages the positive electrode, the negative electrode and the electrolyte 7. A separator may be provided between the positive electrode and the negative electrode as necessary.

As each of the positive electrode and the negative electrode, an electrode composed of a current collector made of metal foil or a metal mesh and an electrode mixture material laminated on the current collector can be used. A positive-electrode active material is contained in the electrode mixture material of the positive electrode, and a negative-electrode active material is contained in the electrode mixture material of the negative electrode.

Further, a tab lead 3 as an extraction terminal is joined to each of current collectors of the positive electrode and the negative electrode. The tab lead 3 shown in FIG. 1 is joined so that a base end portion in a longitudinal direction of the tab lead is joined to the current collector of the positive electrode and the negative electrode existing in the battery outer casing body 2. A leading end portion in the longitudinal direction of the tab lead protrudes to the outside of a lithium secondary battery 1 such that it passes through a heat-sealed portion of the battery outer casing body 2. In the vicinity of the heat-sealed portion of the tab lead 3, a state is created where the tab lead 3 is sandwiched between the two sheet-shaped outer casing materials for a battery 4, 4, and the inner layers 8 of the outer casing materials for a battery 4 are heat-sealed on the surfaces of the tab leads 3.

The battery outer casing body 2 has a shape which is structured such that the tab leads 3 are sandwiched between the two sheet-shaped outer casing materials for a battery 4, 4 so that the inner layers 8, 8 face each other, and the inner layers 8 of the outer casing materials for a battery 4 are heat-sealed to form a bag-shaped outer casing material. The battery outer casing body 2 may be sheet-shaped, or may be processed to be bag-shaped as described below.

A lithium secondary battery 1 shown in FIG. 1 can be, for example, formed by the method described below. First, a bag-shaped battery outer casing body 2 having an opening portion is prepared. The bag-shaped battery outer casing body 2 can be prepared by the optionally selected method, for example, by heat-sealing two battery outer casing bodies or by heat-sealing one folded battery outer casing body at the predetermined position. Next, a positive electrode, a negative electrode, an electrolyte 7, and, as necessary, the separator are inserted into the battery outer casing body 2. Subsequently, an electrolytic solution is further injected into the battery outer casing body as necessary. Then, heat-sealing is performed to seal the opening portion, whereby the lithium secondary battery 1 with the opening portion hermetically sealed as shown in FIG. 1 is obtained.

Figure 12:
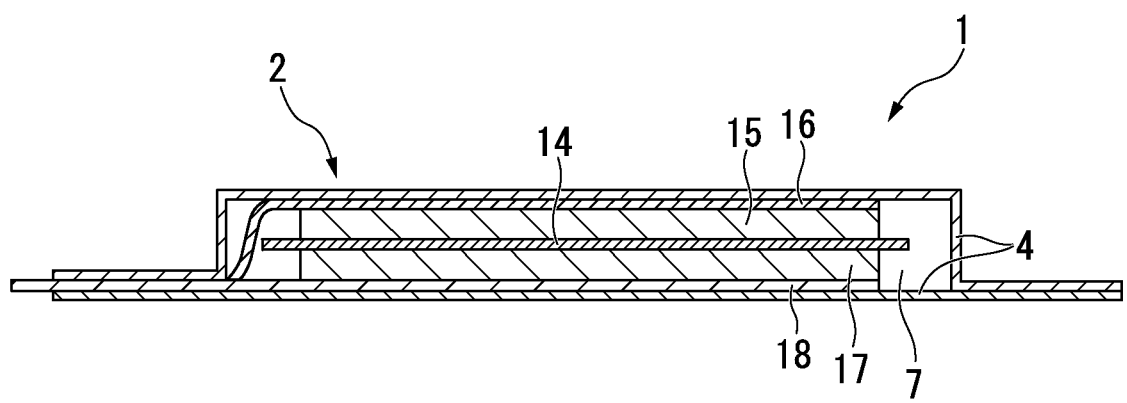
FIG. 12 is a cross-sectional view of an example of a lithium secondary battery of the present invention.

Concrete examples of the lithium secondary battery of the present invention include, for example, a lithium secondary battery 1 as shown in FIG. 12, which comprises a positive electrode (positive electrode mixture material 15, and positive current collector 16), a negative electrode (negative electrode mixture material 17, and negative current collector 18) and an electrolyte 7, and furthermore comprises an outer casing for a battery 2 which stores the positive electrode, the negative electrode and the electrolyte. The outer casing body for a battery 2 shown in the figure, for example, may be structured by laminating two sheet-like outer casing materials for a battery 4 to form a pouch-shaped structure, and the positive electrode, the negative electrode and the electrolyte 7 are provided in said outer casing body for a battery 2. Furthermore, the separator 14 is provided between the positive electrode and the negative electrode. Instead of the separator 14, a solid electrolyte film may be provided between the positive electrode and the negative electrode.

Next, the outer casing material for a battery 4 of this embodiment will be described in detail.

The outer casing material for a battery 4 of this embodiment is a sheet-like material wherein an outer layer 11 made from a heat-resistant resin film, a metal foil layer 10 and an inner layer 8 made from a thermoplastic resin film are laminated in this order via an adhesive layer 5 (not shown and omitted in FIG. 1).

The outer casing material for a battery 4 may have a concave portion (valley portion) formed by deep-drawing or bulging. A portion other than the concave portion may be flat. The concave portion of the battery outer casing body 2, which is formed with the outer casing material for a battery 4, is generated for accommodating the positive electrode, the negative electrode and the electrolyte. The concave portion is a dent when viewed from the inner layer side and the shape thereof can be selected arbitrarily.

(Outer Layer)

The outer layer 11 included in the outer casing material for a battery 4 is constituted to include at least one of or two or more heat-resistant resin films. When the outer layer 11 includes two or more heat-resistant resin films, it is preferable that the heat-resistant resin films be laminated via a dry laminate type adhesive layer.

The heat-resistant resin film constituting the outer layer 11 plays a role in securing formability of the outer casing material for a battery 4 in a case where the concave portion, which receives the positive electrode and the negative electrode, is shaped in the outer casing material for a battery 4. The heat-resistant resin film can be selected as necessary. Concretely, a stretched film of polyamide (nylon) resin or polyester resin is preferably used as the heat-resistant resin film which constitutes the outer layer 11. Furthermore, it is preferable that the melting point of the heat-resistant resin film which constitutes the outer layer 11 be higher than the melting point of the thermoplastic resin film which constitutes the inner layer 8. In this way, it becomes possible to reliably perform the heat-sealing of the opening portion when manufacturing the lithium secondary battery 1.

A difference between the melting point of the heat-resistant resin film constituting the outer layer and the average melting point of layers of the thermoplastic resin film constituting the inner layer can be selected as necessary. For example, a difference in a range of about 30° C. to 100° C. is preferable, and a difference in a range of 40° C. to 50° C. is more preferable.

The melting point of the heat-resistant resin film can be selected as necessary, but a melting point in a range of 100° C. to 300° C. is preferable. For example, a melting point in a range of 100° C. to 300° C. is preferable, and a melting point in a range of 170° C. to 260° C. is more preferable. In another example, a melting point in a range of 100° C. to 200° C. is preferable, and a melting point in a range of 130° C. to 160° C. is more preferable.

The thickness of the outer layer 11 can be selected as necessary. For example, a thickness in a range of about 5 to 100 μm can be generally used, a thickness in a range of about 10 to 50 μm is preferable, and a thickness in a range of about 15 to 30 μm is more preferable. If the thickness is greater than or equal to 10 μm, there is no lack of stretch of the stretched film when performing the shaping of the outer casing material for a battery 4, there is no occurrence of necking in the metal foil layer 10, and shaping defects do not occur. Furthermore, if the thickness is less than or equal to 50 μm, ample formability can be achieved.

(Metal Foil Layer)

The metal foil layer 10 constituting the outer casing material for a battery 4 performs the role of securing the barrier properties of the outer casing material for a battery 4. The metal foil layer 10 can be selected as necessary, and for example, aluminum foil, stainless steel foil, copper foil or the like is used. It is preferable to use aluminum foil in view of its formability and light weight. As a material of the aluminum foil, a pure aluminum-based material or O material (a soft material), which is an aluminum-iron-based alloy, is preferably used.

The thickness of the metal foil layer 10 can be selected as necessary, and for example, a thickness in a range of 10 to 150 μm can generally be used. For securing workability and barrier properties which prevent infiltration of oxygen or moisture into the battery, a thickness in a range of 20 to 80 μm is preferable and a thickness in a range of 35 μm to 80 μm is more preferable. If the thickness of the metal foil layer 10 is greater than or equal to 20 μm, there is no occurrence of fracture of metal foil during the shaping of the outer casing body for a battery 4 to form a battery outer casing body 2, there is no generation of a pinhole, and infiltration of oxygen or moisture can be prevented. Furthermore, if the thickness is less than or equal to 80 μm, the effect of preventing fracture during shaping and the effect of preventing generation of a pinhole are maintained when the shaping of the outer casing body for a battery 4 is performed to form a battery outer casing body 2. Furthermore, the total thickness of the outer casing body for a battery 4 does not become excessively thick, an increase in weight can be prevented due to the increased barrier properties, and the volumetric energy density of the lithium secondary battery 1 can be improved.

Further, in order to improve adhesiveness to the outer layer 11 and the inner layer 8 or improve corrosion resistance, the metal foil layer 10 may also be subjected to undercoating treatment by a silane-coupling agent, a titanium-coupling agent or the like, or chemical conversion treatment by chromate treatment or the like.

(Inner Layer)

Next, the inner layer 8 included in the outer casing material for a battery 4 is a layer composed of a thermoplastic resin film. As the thermoplastic resin film which is used for the inner layer 8, although it can be selected as necessary, a resin film is preferable which has heat-sealing properties, is excellent in chemical resistance to an electrolyte 7 or the like of the lithium secondary battery 1 having strong corrosive properties, and is excellent in insulation properties between the metal foil layer 10 and the positive electrode or the negative electrode of the lithium secondary battery 1.

The thickness of the inner layer 8 can be selected as necessary, and for example, a thickness in a range of about 0.1 to 400 μm can be generally used. A thickness in a range of 20 to 100 μm is preferable, and a thickness in a range of 30 to 90 μm is more preferable. If the thickness is greater than or equal to 20 μm, heat-sealing strength of the outer casing material for a battery 4 can increase sufficiently, corrosion resistance to an electrolytic solution 7 or the like of the lithium secondary battery 1 can be improved, and insulation properties between the metal foil layer 10 and the positive electrode or the negative electrode can be enhanced. Further, if the thickness of the inner layer 8 is less than or equal to 100 μm, preferably, there is no obstacle to heat-sealing properties and chemical resistance of the outer casing material 4 for a battery, and the volumetric energy density of the lithium secondary battery 1 can be improved.

In this embodiment, as shown in FIG. 2, the inner layer 8 includes two layers, that is, has a base material layer 8a and a sealant layer 8b of the inner layer 8, wherein the sealant layer 8b is positioned as a surface thereof on the opposite side to the metal foil layer 10.

A melting point of the base material layer 8a is preferably in a range of 140 to 170° C., and a melting point in a range of 150 to 165° C. is more preferable. A melting point of the sealant layer 8b is preferably in a range of 130° C. to 155° C., and melting point in a range of 135° C. to 145° C. is more preferable. It is preferable that the melting point of the base material layer 8a be larger than that of the sealant layer 8b. When the melting points of the base material layer 8a and the sealant layer 8b are in the aforementioned ranges, the inner layer 8 can be obtained which is excellent in heat resistance and has stable heat-seal performance. Furthermore, it is preferable that the melt flow rate of the base material layer 8a be smaller than that of the sealant layer 8b.

A ratio (structural ratio) of thickness of the base material layer 8a and thickness of the sealant layer 8b of the inner layer 8 (base material layer:sealant layer) is preferably in a range of 9:1 to 2:8, and more preferably in a range of 8:2 to 5:5. When the ratio of thickness of the base material layer 8a and thickness of the sealant layer 8b is in the above range, an excellent effect of electrical insulation performance can be sufficiently obtained, and excellent heat-sealing property of the sealant layer 8b can be secured.

The sealant layer 8b is a layer made from a propylene-ethylene random copolymer wherein a melt flow rate (MFR) at 230° C. thereof is in a range of 3 to 30 g/10 minutes. In this embodiment, since the melt flow rate (MFR) of the sealant layer 8b is in the above range, the outer casing material for a battery 4 can be obtained which has superior conformability to difference in level, and adherence between the outer casing material for a battery 4 and the tab lead 3 is increased, and therefore the lithium secondary battery 1 which has high hermetic sealing properties can be obtained. Furthermore, it is preferable that a melt flow rate (MFR) at 230° C. of the sealant layer 8b be in a range of 4 to 25 g/10 minutes, and still more preferably in a range of 5 to 20 g/10 minutes. With respect to MFR, numerical values measured by JIS K 7210 at a load of 21.18 N (2.16 kg) can be used.

Materials of such a sealant layer 8b can be selected as necessary. Concretely, it is preferable that the sealant layer 8b be made from a propylene-ethylene random copolymer wherein ethylene content thereof is, for example, 0.5 to 7% by weight and preferably 1 to 4% by weight, or made from a propylene-ethylene-butene copolymer wherein ethylene content thereof is 0.5 to 7% by weight, and preferably 1 to 4% by weight.

The base material layer 8a is a layer made of a resin composition wherein a melt flow rate at 230° C. thereof is in a range of 0.1 to 15 g/10 minutes, the composition includes 50 to 80% by weight of a propylene component (A) and 50 to 20% by weight of a copolymer component (B) shown below, and a xylene-soluble component Xs satisfies the following (I) to (V). The resin composition can be generated by optionally selected method. For example, the resin composition can be generated by mixing or kneading the propylene component (A) and the copolymer component (B).

The copolymer component (B) included in the base material layer 8a is an elastomer which is a copolymer of propylene and ethylene and/or α-olefin having 4 to 12 carbons, and includes 50 to 85% by mass of a polymerization unit originated from propylene. That is, the copolymer component (B) may be an elastomer which is a copolymer of propylene and ethylene, an elastomer which is a copolymer of propylene and α-olefin having 4 to 12 carbons, or an elastomer of a copolymer of propylene, ethylene and α-olefin having 4 to 12 carbons. Examples of the α-olefin having 4 to 12 carbons includes 1-butene, 1-hexene, 1-octene, 1-decene and 1-dodecene.

(I) Propylene content Fp is 50 to 80% by mass;

(II) Limiting viscosity [η] of the xylene-soluble component Xs is 1.4 to 5.0 dL/g.

(III) A ratio (Xs/Xi) of limiting viscosity [η] of the xylene-soluble component Xs and limiting viscosity [η] of the xylene-insoluble component Xi is 0.7 to 1.5.

(IV) Propylene content (Pp) of a high propylene content component is greater than or equal to 60% by mass and less than 95% by mass, and propylene content (P'p) of a low propylene content component is greater than or equal to 20% by mass and less than 60% by mass, wherein the contents are defined by a 2-site model.

A definition of a 2-site model is described in H. N. Cheng, Journal of Applied Polymer Science, Vol. 35, pp. 1639-1650 (1988).

(V) A ratio (Pp/P'p) of the propylene content (Pp) of the high propylene content component and the propylene content (P'p) of the low propylene content component, which are defined by a 2-site mode, satisfies formula (1) shown below, and a ratio (Pf1) of the high propylene content component to the propylene content Fp of the xylene-soluble component Xs and a ratio (1−Pf1) of the low propylene content component to the propylene content Fp of the xylene-soluble component Xs satisfy (2) shown below.

$$Pp/P'p \geq 1.90 \tag{1}$$

$$2.00 < Pf1/(1-Pf1) < 6.00 \tag{2}$$

The propylene content (Pp) and the propylene content (P'p) determined by the 2-site model are obtained by the following method. First, two active points, that is, an active point (P) at which propylene is preferentially polymerized and an active point (P') at which ethylene is preferentially polymerized are assumed. The propylene content Pp and Pp', which are reaction probabilities at the two active points, and a ratio Pf1 which is a ratio of the active point (P), at which propylene is preferentially polymerized, to total active point, are provided as parameters. Then, the propylene contents can be obtained by optimizing the aforementioned three parameters (Pp, P'p and Pf1) so that the actual relative strength of a $^{13}$C-NMR spectrum approximates to the probability equations shown by <1> to <10>. Here, Pp, P'p, Fp and Pf1 can be obtained by statistical analysis of the $^{13}$C-NMR spectrum.

As described above, a definition of a 2-site model is described in H. N. Cheng, Journal of Applied Polymer Science, Vol. 35, pp. 1639-1650 (1988).

TABLE 1

| Signal | | Probability equations of 2-site model |
|---|---|---|
| <1> | Sαα | $P_p^2 \times P_{f1} + P'^2_p \times (1 - P_{f1})$ |
| <2> | Sαγ | $(-2P_p^3 + 2P_p^2) \times P_{f1} + (-2P'^3_p + 2P'^2_p) \times (1 - P_{f1})$ |
| <3> | Sαδ | $(2P_p^3 - 4P_p^2 + 2P_p) \times P_{f1} + (2P'^3_p - 4P'^2_p + 2P'_p) \times (1 - P_{f1})$ |
| <4> | Tδδ | $(P_p^3 - 2P_p^2 + P_p) \times P_{f1} + (P'^3_p - 2P'^2_p + P'_p) \times (1 - P_{f1})$ |
| <5> | Tβδ + Sγγ | $(P_p^4 - 4P_p^3 + 3P_p^2) \times P_{f1} + (P'^4_p - 4P'^3_p + 3P'^2_p) \times (1 - P_{f1})$ |
| <6> | Sγδ | $(-2P_p^4 + 6P_p^3 - 6P_p^2 + 2P_p) \times P_{f1} + (-2P'^4_p + 6P'^3_p - 6P'^2_p + 2P'_p) \times (1 - P_{f1})$ |
| <7> | Sδδ | $(P_p^4 - 5P_p^3 + 9P_p^2 - 7P_p + 2) \times P_{f1} + (P'^4_p - 5P'^3_p + 9P'^2_p - 7P'_p + 2) \times (1 - P_{f1})$ |
| <8> | Tββ | $P_p^3 \times P_{f1} + P'^3_p \times (1 - P_{f1})$ |
| <9> | Sβδ | $(2P_p^3 - 4P_p^2 + 2P_p) \times P_{f1} + (2P'^3_p - 4P'^2_p + 2P'_p) \times (1 - P_{f1})$ |
| <10> | Sββ | $(-P_p^3 + 2P_p^2) \times P_{f1} + (-P'^3_p + 2P'^2_p) \times (1 - P_{f1})$ |

Pp, P'p and Pf1 which are defined by the 2-site model and the propylene content Fp satisfy the following formula (3).

$$Fp = Pp \times Pf1 + P'p \times (1 - Pf1) \tag{3}$$

Pp and P'p preferably satisfy the following formula (4). Pp and P'p more preferably satisfy the following formula (5).

$$1.95 \leq Pp/P'p \leq 2.40 \tag{4}$$

$$1.95 \leq Pp/P'p \leq 2.35 \tag{5}$$

Furthermore, it is preferable that Pf1/(1−Pf1) satisfy the following formula (6). Furthermore, it is more preferable that Pf1/(1−Pf1) satisfy the following formula (7).

$$2.50 \leq Pf1/(1-Pf1) < 5.50 \tag{6}$$

$$3.00 < Pf1/(1-Pf1) < 5.00 \tag{7}$$

Next, a method for defining Pp, P'p and Pf1 by the 2-site model is explained by figures using an example wherein the copolymer component (B) is an elastomer of a copolymer of propylene and ethylene.

Figure 10:
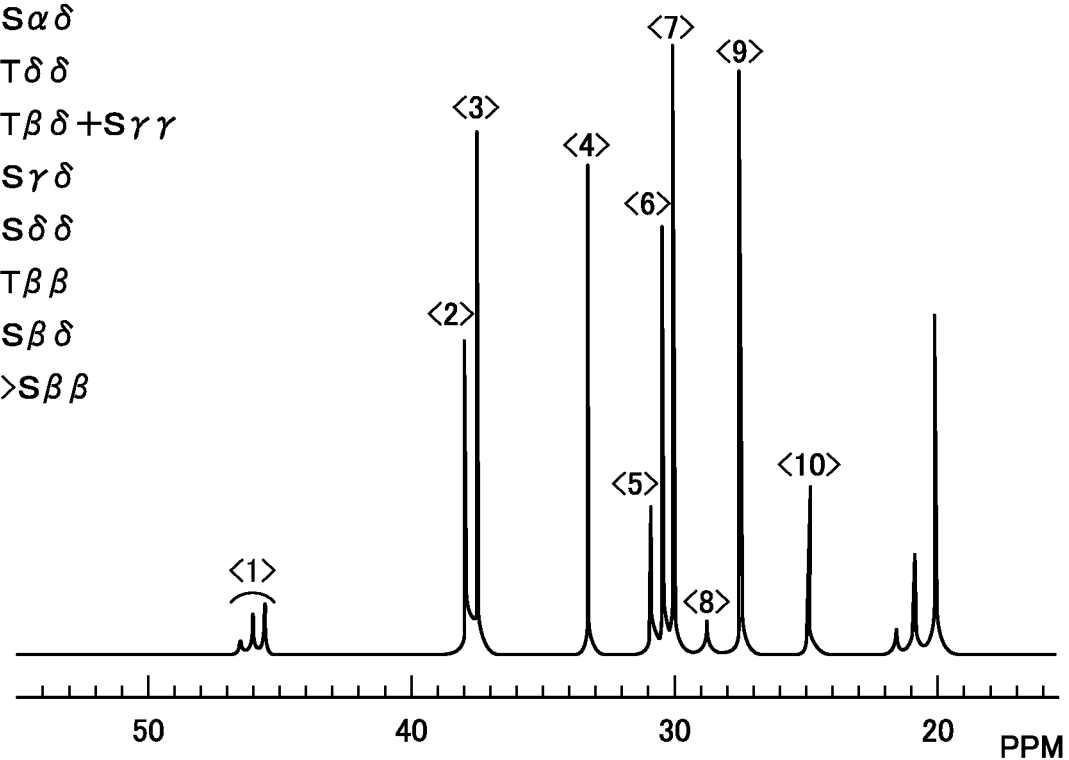
FIG. 10 is a $^{13}$C-NMR spectrum of a typical elastomer of a copolymer of propylene and ethylene.
Figure 11:
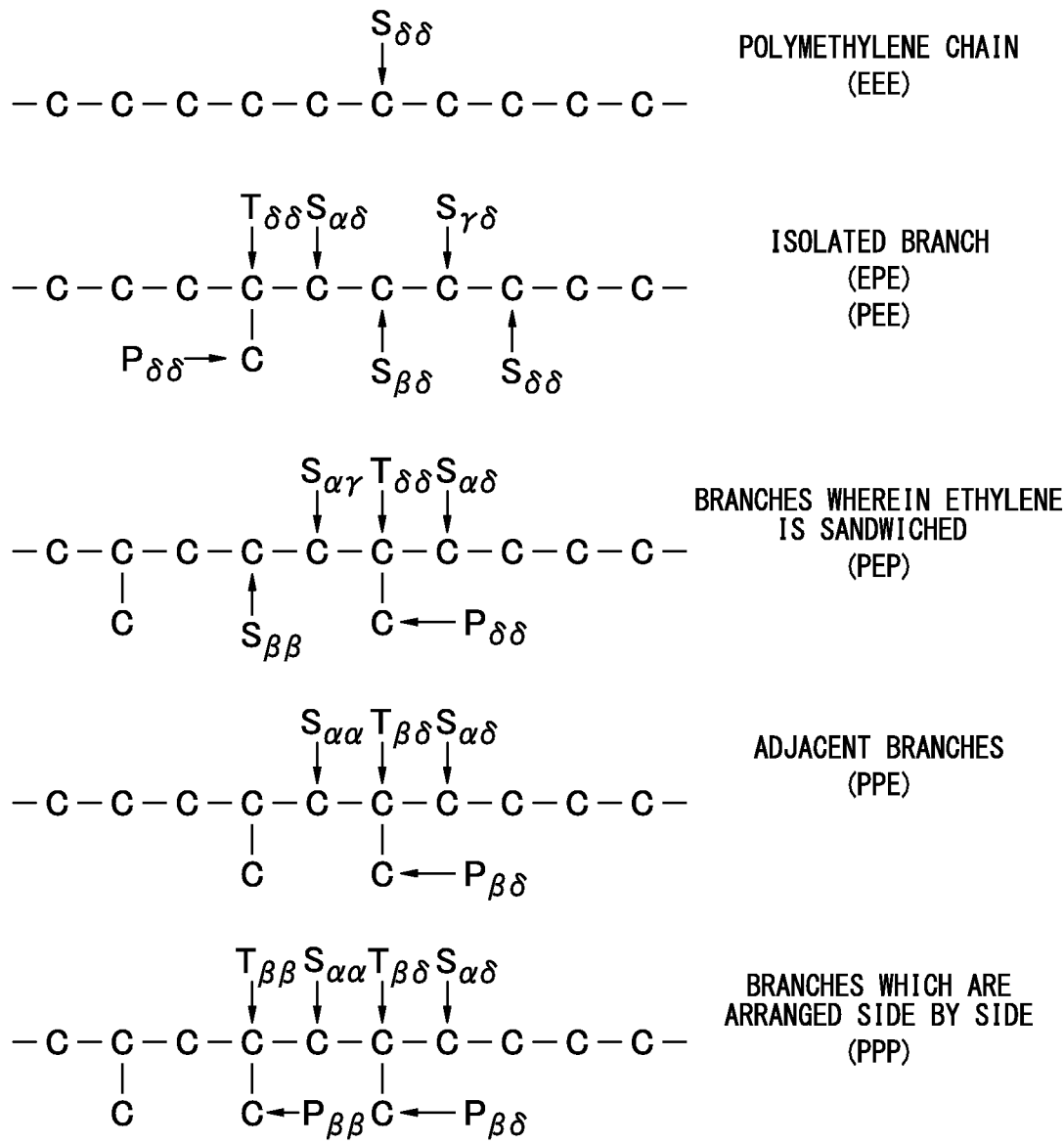
FIG. 11 is a view which shows names of the sequence distribution.

FIG. 10 is a $^{13}$C-NMR spectrum of a typical elastomer which is a copolymer of propylene and ethylene. The spectrum shown in FIG. 10 has ten different peaks (<1> to <10>) according to differences of sequence distributions (arrangements of ethylene and propylene). The designations of the sequence distribution are described in Macromolecules, Vol. 10, pp 536-544 (1977), and are called as shown in FIG. 11.

Such sequence distributions can be represented by a product of reaction probabilities when a copolymerization reaction mechanism of the copolymer component (B) is assumed. Accordingly, when the total peak intensity is defined as 1, the relative intensity of each peak (<1> to <10>) shown in FIG. 10 can be expressed by a Bernoulli statistical probability equation wherein reaction probability and an abundance ratio of each site are shown by parameters.

That is, for example, in the case of the peak of <1> Sαα shown in FIG. 10, when a propylene unit is represented by symbol "P" and an ethylene unit is represented by symbol "E", possible chains are 3 types of [PPPP], [PPEE] and [EPPE]. When the three types of sequence distributions are expressed by reaction probability respectively and they are added together, the probability equation <1> shown in Table 1 is obtained. Regarding the remaining peaks of <2> to <10> shown in FIG. 10, it is also possible to be shown as probability equations <2> to <10> shown in Table 1. Therefore, definition can be performed by optimizing parameters (Pp, P'p and Pf1) so that the actually measured peak intensities of $^{13}$C-NMR spectrum become the nearest to the probability equations <1> to <10> shown in Table 1.

When the parameters (Pp, P'p, Pf1) are optimized, regression calculation is performed until a difference between the actually measured peak intensity and the theoretical value obtained by each probability equation is less than or equal to $1 \times 10^{-5}$ by the least-squares method. Algorithm or the like wherein such regression calculation is performed is, for example, described in H. N. CHENG, Journal of Applied Polymer Science, Vol. 35, pp. 1639-1650 (1988).

The propylene content component included in the resin composition is classified into two kinds of high and low, that is, into a high propylene content component and a low propylene content component. The high propylene content component and low propylene content component are classified such that a part wherein propylene content is 60% by mass or more is determined as a high propylene content component, and the other part wherein propylene content is less than 60% by mass is determined as a low propylene content component.

In this embodiment, since a melt flow rate (MFR) of the base material layer 8a is in the above range, effects can be obtained wherein impact resistance of the outer casing material for a battery 4 is excellent, and workability and mold ability are also excellent. Furthermore, when a melt flow rate (MFR) of the base material layer 8a is less than 0.1 g/10 minutes, too large a load may be applied or a resin to be molded may be hard to spread when kneading is performed by an extruder which forms the outer casing material for a battery 4, and therefore workability and mold ability deteriorate. When a melt flow rate (MFR) of the base material layer 8a exceeds 15 g/10 minutes, impact resistance of the outer casing material for a battery 4 becomes insufficient at a low temperature. A melt flow rate (MFR) of the base material layer 8a is preferably 0.5 to 10 g/10 minutes, and more preferably 1 to 5 g/10 minutes.

Furthermore, a resin composition which forms the base material layer 8a comprises 50 to 80% by mass of the polypropylene component (A) and 50 to 20% by mass of the copolymer component (B) described above and furthermore a xylene-soluble component Xs of the resin composition satisfies the following (I) to (V). Accordingly, the copolymer component (B) is incorporated in propylene of the propylene component (A), and a high affinity between the polypropylene component (A) and the copolymer component (B) can be achieved. The recitation "copolymer component (B) is incorporated in propylene of the propylene component (A)" means that an "island-sea structure" is formed, that is, "islands (particles)" composed of the copolymer component (B) are dispersed in "sea (matrix)" composed of the propylene component (A).

In this embodiment, since the resin composition which forms the base material layer 8a has the aforementioned island-sea structure, when a film is formed from such a resin composition which forms the base material layer 8a, excellent insulating performance is obtained, and an phenomenon is hard to be caused wherein voids are generated at the interfaces of the polypropylene and the elastomer component (rubber component) wherein such a phenomenon is generally caused when block-type polypropylene is used. Furthermore, excellent resistance to whitening on bending can be achieved, and deterioration of sealing strength is small when an outer casing body for a battery 2 is generated by heat sealing.

In the resin composition which forms the base material layer 8a, the island-sea structure is hard to be formed when the amount of the propylene component (A) is less than or exceeds the above range. Furthermore, the amount of the propylene component (A) incorporated in the copolymer component (B) becomes insufficient, an affinity between the polypropylene component (A) and the copolymer component (B) becomes small, and the base material layer 8a which has less voids cannot be obtained.

Furthermore, when the content of the copolymer component (B) is less than 20% by mass, adverse effects are generated such that impact resistance at a low temperature deteriorates, and when the content of the copolymer component (B) exceeds 50% by mass, rigidity and heat resistance deteriorate. The content of the copolymer component (B) is preferably 20 to 45% by mass, and still more preferably 20 to 40% by mass.

Furthermore, when the xylene-soluble component Xs does not satisfy the aforementioned (I) to (V), an affinity between the polypropylene component (A) and the copolymer component (B) decreases, and the base material layer 8a which has less voids is not obtained as described below.

(I) Propylene content Fp is 50 to 80% by mass. It is preferable that the propylene content Fp be in a range of 60 to 80% by mass, and still more preferably 70 to 80% by mass. The xylene-soluble component Xs of the resin composition which forms the base material layer 8a satisfies the aforementioned (I), and has excellent impact resistance at a low temperature and excellent heat resistance can be obtained. When the xylene-soluble component Xs does not satisfy (I), a resin composition which is excellent in both impact resistance at a low temperature and heat resistance cannot be obtained.

(II) Limiting viscosity [η] of the xylene-soluble component Xs is 1.4 to 5.0 dL/g, more preferably 2.0 to 4.5 dL/g and still more preferably 2.5 to 4.0 dL/g.

When the limiting viscosity [η] of the xylene-soluble component Xs exceeds 5.0 dL/g, affinity deteriorates although impact resistance is improved. Furthermore, when the limiting viscosity [η] of the xylene-soluble component Xs is less than 1.4 dL/g, impact resistance at a low temperature deteriorates.

(III) A ratio (Xs/Xi) of limiting viscosity [η] of the xylene-soluble component Xs and limiting viscosity [η] of the xylene-insoluble component Xi is 0.7 to 1.5, more preferably 0.7 to 1.3, and still more preferably 0.8 to 1.2. When the aforementioned ratio (Xs/Xi) is less than 0.7, impact resistance at a low temperature deteriorates although affinity is improved, and when the ratio exceeds 1.5, affinity deteriorates.

(IV) Propylene content (Pp) of a high propylene content component is greater than or equal to 60% by mass and less than 95% by mass, preferably greater than or equal to 65% by mass and smaller than or equal to 90% by mass or less, and more preferably greater than or equal to 70% by mass and smaller than or equal to 90% by mass or less. Furthermore, propylene content (P'p) of a low propylene content component is greater than or equal to 20% by mass and less than 60% by mass, preferably greater than or equal to 25% by mass and smaller than or equal to 55% by mass or less, and more preferably greater than or equal to 30% by mass and smaller than or equal to 50% by mass or less.

When the propylene content (Pp) of a high propylene content component is less than the above range, heat resistance of a film deteriorates, and when the content exceeds the above range, impact resistance at a low temperature deteriorates. Furthermore, when the propylene content (P'p) of a low propylene content component is less than the above range, impact resistance at a low temperature deteriorates.

(V) The aforementioned formulas (1) and (2) are indices which show the composition distribution of the xylene-soluble component Xs. The formula (1) is a barometer of the compositional difference of the components generated at the aforementioned two active points. The formula (2) is a barometer of an amount of the components generated at the aforementioned two active points.

When (Pp/P'p) shown in the formula (1) is less than 1.90 and Pf1/(1−Pf1) shown in the formula (2) is smaller than or equal to 2.00, strength of the boundary of the xylene-soluble component Xs and the xylene-insoluble component Xi deteriorates (affinity deteriorates), whitening on bending of a film is caused and insulating properties deteriorate. Furthermore, when Pf1/(1−Pf1) shown in the formula (2) is greater than or equal to 6.00, rigidity and impact resistance at a low temperature decrease although strength of the boundary of the xylene-soluble component Xs and the xylene-insoluble component Xi increases.

A film composed of the resin composition which forms the base material layer 8a has insufficient heat-sealing properties at a low temperature when the film is singly used as an inner layer 8 of the outer casing material for a battery 4. In this embodiment, as shown in FIG. 2, since the sealant layer 8b, which has large melt flow rate, is positioned on the base material layer 8 as a surface on the opposite side to the metal foil layer 10a, the outer casing material for a battery 4 can be obtained which has excellent heat-sealing properties.

In this embodiment, it is preferable that the refractive index of the xylene-insoluble component Xi be in a range of 1.490 to 1.510, and the refractive index of the xylene-soluble component Xs be in a range of 1.470 to 1.490. When the refractive index of the xylene-insoluble component Xi and the refractive index of the xylene-soluble component Xs are in the above ranges, excellent impact resistance at a low temperature can be achieved, and high affinity between the xylene-insoluble component Xi and the xylene-soluble component Xs can be achieved.

The refractive index of the xylene-insoluble component Xi is more preferably 1.493 to 1.505, and still more preferable 1.495 to 1.503. When the refractive index of the xylene-insoluble component Xi is less than 1.490, rigidity and impact resistance at a low temperature may decrease, and when the refractive index of the xylene-insoluble component Xi exceeds 1.510, impact resistance at a low temperature may decrease.

The refractive index of the xylene-soluble component Xs is more preferably 1.473 to 1.485. When the refractive index of the xylene-soluble component Xs exceeds 1.490, impact resistance at a low temperature may decrease although affinity between the xylene-insoluble component Xi and the xylene-soluble component Xs increases. Furthermore, when the refractive index of the xylene-soluble component Xs is less than 1.470, affinity between the xylene-insoluble component Xi and the xylene-soluble component Xs may deteriorate although impact resistance at a low temperature increases.

Furthermore, the inner layer 8 of this embodiment can be formed by laminating a base material layer 8a and a sealant layer 8b and subsequently performing the T-die molding method or inflation molding method.

Here, in this embodiment, an example is explained wherein the inner layer 8 is composed of two layers which are a base material layer 8a and a sealant layer 8b which is positioned as a surface on the opposite side to the metal foil layer 10 of the inner layer 8. However, the present invention is not limited thereto.

Figure 3:
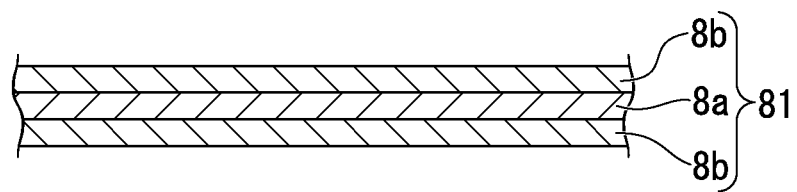
FIG. 3 is a cross-sectional view which explains another example of an outer casing material for a battery of the present invention.
Figure 4:
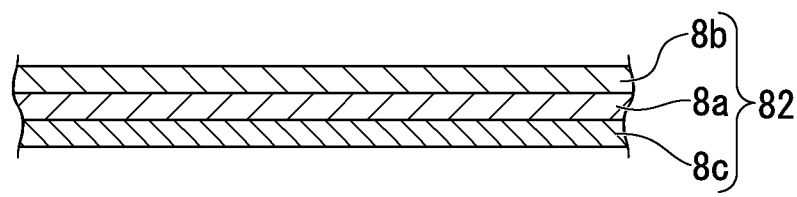
FIG. 4 is a cross-sectional view which explains another example of an outer casing material for a battery of the present invention.

For example, as shown in FIG. 3, an inner layer 81 may be composed of three layers wherein sealant layers 8b are provided on both surfaces of a base material layer 8a. Furthermore, as shown in FIG. 4, an inner layer 82 may be composed of three layers wherein a sealant layer 8b is positioned on the surface of the base material layer 8a on the opposite side to the metal foil layer 10, and a coating layer 8c, which is made from homopolypropylene, random polypropylene or block polypropylene, is positioned on the other surface of the base material layer 8a on the side where the metal foil layer 10 exists.

In the present invention, each measurement can be performed as follows. Measurement of xylene-soluble component Xs: 2.5 g of a sample is provided in 250 ml of ortho-xylene. The mixture is heated to a boiling temperature thereof while stirring, and the sample is dissolved completely over 30 minutes or more. After the sample is completely dissolved, the mixture is allowed to cool until a temperature thereof becomes 100° C. or less. Then, the sample is maintained for 2 hours in a thermostatic bath wherein the temperature thereof is maintained at 25° C. Subsequently, precipitate (xylene-insoluble component Xi) is separated with filter paper to obtain filtrate. Then, while heating, xylene is removed from the filtrate under a nitrogen atmosphere, and drying is performed to obtain a xylene-soluble component Xs to be measured.

Measurement of Limiting Viscosity:

Measurement is performed at a temperature of 135° C. in decalin.

Measurement of Refractive Index:

Using each of the xylene-soluble component Xs and the xylene-insoluble component Xi, a film having a thickness of 50 to 80 μm is formed by press molding (preheating is performed for 5 minutes at a temperature of 230° C., deaerating is performed for 30 seconds, compression is performed at 6 MPa for 1 minute, and then cooling is performed for 3 minutes while pressing to form a film). The obtained film is maintained at a room temperature for 24 hours, and subsequently, measurement of the film is performed with Abbe refractometer manufactured by Atago Co., Ltd, using ethylsalicylate as contact liquid.

Here, method and evaluation method which are not explained in particular may be measured, for example, using measurement method described in Japanese Unexamined Patent Application, First Publication No. 2004-27218.

(Adhesive Layer)

It is preferable that an adhesive layer 5 be a dry lamination type adhesive layer. In this embodiment, as shown in FIG. 2, a metal foil layer 10 and an outer layer 11 are laminated to each other, and an inner layer 8 and a metal foil layer 10 are laminated to each other, via the dry lamination type adhesive layers provided between them.

For the dry lamination type adhesive layer, for example, at least one type of adhesive can be used which is selected from a urethane-based adhesive, an acid-modified polyolefin adhesive, a styrene elastomer adhesive, an acrylic adhesive, a silicone-based adhesive, an ether-based adhesive and an ethylene-vinyl acetate-based adhesive.

It is preferable that adhesive layers 5 made of different materials be used as the adhesive layer 5 on the outer layer 11 side and as the adhesive layer 5 on the inner layer 8 side. When the adhesive layer 5 on the outer layer 11 side and the adhesive layer 5 on the inner layer 8 side are made of different materials so that they suit for materials of the inner layer 8 and the outer layer 11, adhesive strength between the metal foil layer 10 and the outer layer 11 and between the inner layer 8 and the metal foil layer 10 can be furthermore improved and electrolytic solution resistance performance can be improved.

When the outer layer 11 is composed of polyethylene terephthalate (PET) or nylon, it is preferable that a urethane-based adhesive be used as an adhesive layer 5 provided between the metal foil layer 10 and the outer layer 11. Furthermore, in a case where the inner layer 8 is composed of polypropylene, it is preferable that an acrylic adhesive or an acid-modified olefin-based adhesive be used as an adhesive layer 5 provided between the inner layer 8 and the metal foil layer 10.

The thickness of the adhesive layer 5 can be selected as necessary. The thickness in a range of 0.1 to 10 μm is preferable, and the thickness in a range of 1 to 5 μm is more preferable. If the thickness of the adhesive layer 5 is less than 0.1 μm, sufficient adhesive strength may not be obtained. If the thickness of the adhesive layer 5 exceeds 10 μm, there is a disadvantage in terms of costs since influence of a temperature variation and a time variation tends to arise. If the thickness of the adhesive layer 5 is in the range of 1 to 5 μm, excellent adhesiveness can be obtained and insulation properties of the inner layer 8 can further increase at the side of the inner layer 8.

Manufacturing method of the outer casing material for a battery 4 of this embodiment will be explained using an example.

First, an adhesive for dry lamination is applied to the surface of the outer layer 11 or the metal foil layer 10 to form an adhesive layer 5, and a solvent contained in the adhesive for dry lamination is volatilized. Then, a dry-laminated film including the outer layer 11 and the metal foil layer 10 is formed by dry-laminating the outer layer 11 and the metal foil layer 10.

Next, an adhesive for dry lamination is applied to the surface of the inner layer 8 or to the surface of the metal foil layer 10 of the dry-laminated film which comprises the outer layer 11 and the metal foil layer 10 to form another adhesive layer 5, and a solvent contained in the adhesive is volatilized. Then, the inner layer and the dry-laminated film comprising the outer layer 11 and the metal foil layer 10 are dry-laminated. In this way, the outer casing material for a battery 4 of this embodiment shown in FIG. 2 can be manufactured.

The manufacturing method of the outer casing material for a battery 4 of this embodiment is not limited to the aforementioned example. For example, although the metal foil layer 10 and the inner layer 8 may be adhered by dry-lamination wherein an adhesive layer 5 is provided between them, the metal foil layer 10 and the inner layer 8 may be adhered by heat-lamination such that an adhesive layer 5 is provided by extruding a thermally adhesive resin between the metal foil layer 10 and the inner layer 8. In this case, suitable adhesion between the metal foil layer 10 and the inner layer 8 can be obtained.

As a thermally adhesive resin which can be used for adhering the metal foil layer 10 and the inner layer 8, it is preferable that thermally adhesive resin be used which has excellent electrolytic solution resistance and/or chemical resistance such as maleic anhydride-modified polypropylene which is modified by maleic anhydride or the like. Furthermore, when heat lamination is performed such that a thermally adhesive resin is provided as the adhesive layer 5 between the metal foil layer 10 and the inner layer 8, the method such as described below has an advantage in terms of costs as compared with the method wherein a single thermally adhesive resin layer is used. That is, a coextruded resin, wherein modified polypropylene resin and polypropylene which is the same type polyolefin as the thermoplastic resin film of the inner layer 8 are laminated, is used to perform heat-lamination between the metal foil layer 10 and the modified polypropylene resin and heat-lamination between the inner layer 8 and the polypropylene.

Since the outer casing material for a battery 4 of this embodiment is manufactured by a dry-lamination method with an adhesive, it is preferable that general corona treatment be performed for the surface of the base material layer 8a of the inner layer 8. When the general corona treatment is performed for the surface of the base material layer 8a, affinity between the adhesive layer 5 and the base material layer 8a can increase to increase high adhesive strength.

The outer casing material for a battery 4 of this embodiment includes the inner layer 8 having the base material layer 8a and the sealant layer 8b. Accordingly, both excellent insulating performance and heat-sealing properties can be achieved, since the base material layer 8a has few voids, which are easily generated when block-type polypropylene is used, and the sealant layer 8b is positioned on the base material layer 8a on the opposite side to the metal foil layer 10 and has a large melt flow rate.

Since the lithium secondary battery 1 of this embodiment is equipped with the outer casing material for a battery 4 of this embodiment, generation of an internal short-circuit through the metal foil layer 10 of the outer casing material for a battery 4 can be suppressed.

The insulation properties of the inner layer 8 of the battery outer casing material 4 can be evaluated by the following evaluation method.

First, the aforementioned lithium secondary battery 1 shown in FIG. 1, which includes an outer casing body for a battery 2 composed of the outer casing material for a battery 4 shown in FIG. 2, is manufactured, and the outer layer 11 of the outer casing body for a battery 4 is partially removed to expose the metal foil layer 10. It is preferable that a position where the metal foil layer 10 is exposed be a position away from the tab lead 3 as much as possible.

Subsequently, a conducting wire is connected to the exposed metal foil layer 10, and a conducting wire is also connected to the tab lead 3 of either the positive electrode or the negative electrode. Instead of exposing the metal foil layer 10 by partial removal, it is possible that an electrically-conductive tape be attached to an exposed end face of the metal foil layer 10 and a conducting wire be connected to the electrically-conductive tape.

Then, a power supply and a resistance-measuring instrument are inserted between the conducting wire, which is connected to the exposed metal foil layer 10, and the conducting wire, which is connected to the tab lead 3. Then, voltage is applied between the metal foil layer 10 and the tab lead 3 through the conducting wires from the power supply, a resistance value between the metal foil layer 10 and the tab lead 3 at this time is measured by the resistance-measuring instrument, and the insulation properties of the inner layer 8 of the outer casing material for a battery 4 are evaluated by the obtained resistance value.

That is, it is preferable that the outer casing material for a battery 4 of this embodiment have a resistance value of $1 \times 10^6 \Omega$ or more when direct-current voltage in a range of 5 to 50 volts is applied between the metal foil layer 10 and the tab lead 3.

Here, when evaluating the insulation properties of the inner layer 8 of the battery outer casing material 4, a test cell can also be used in which a tab lead 3 is attached to the battery outer casing material 4 instead of the above-described lithium secondary battery, and the inside of the battery outer casing body 2 is filled with an electrolytic solution.

EXAMPLES

Example 1

An outer layer film was manufactured by dry-laminating a stretched polyethylene terephthalate film (manufactured by Toray Industries, Inc., general-purpose product) having a thickness of 12 µm and a stretched polyamide film (BONYL RX manufactured by Kohjin Co., Ltd.) having a thickness of 15 µm with a two-component urethane-based adhesive layer having a thickness of 3 µm interposed therebetween.

Subsequently, a dry lamination film, which had the outer layer and a metal foil, was manufactured by dry-laminating the obtained outer layer film and aluminum foil (a material according to JIS standard A8079H-O) having a thickness of 40 µm with a two-component urethane-based adhesive layer having a thickness of 3 µm interposed therebetween under the conditions of speed: 80 m/min and roll temperature: 80° C.

Subsequently, an unstretched polypropylene film having a thickness of 80 µm composed of two layers, wherein the structural ratio (thickness ratio) of the film was 7:3 (base material layer:sealant layer), was prepared as an inner layer by laminating PP-1 shown in Table 2, and a propylene-ethylene copolymer (product name: F-744NP, manufactured by Prime Polymer Co., Ltd.), which was a sealant layer wherein ethylene content thereof was 4% by mass and MFR thereof was 7.5 g/10 minute, and forming the film by a T-die shaping method. ("B" (copolymer component) shown in Table 2 is an elastomer of a copolymer of propylene and ethylene, and a polymerization unit shown in Table 2 means a unit derived from propylene), which was a film-like resin composition (base material layer.)

Subsequently, an outer casing material for a battery of Example 1 was manufactured by dry-laminating the unstretched polypropylene film prepared as the inner layer and the dry lamination film including the outer layer and the metal foil, with a two-component acrylic adhesive layer having a thickness of 1.5 µm interposed therebetween under the conditions of speed: 80 m/min and a roll temperature: 80° C.

Example 3

An unstretched polypropylene film having a thickness of 80 µm composed of triple layers, which had a structural ratio (thickness ratio) of 2:6:2 (sealant layer:base material layer: sealant layer), was prepared as an inner layer by a T-die shaping method such that a propylene-ethylene copolymer (product name: PM731M, manufactured by Sun Aroma Co., Ltd.) wherein ethylene content was 3% by mass and MFR thereof was 9.5 g/10 minutes was provided as a sealant layer on the both surfaces of PP-1 (resin composition (base material layer)) shown in Table 2.

Then, an outer casing material for a battery of Example 3 was manufactured similar to Example 1, except that the unstretched polypropylene film obtained as described above was used as an inner layer.

Comparative Example 1

An outer casing material for a battery of Comparative Example 1 was manufactured similar to Example 1, except that an unstretched polypropylene film was prepared using PP-3 shown in Table 2, which was a film-like resin composition (base material layer), as a base material layer of an inner layer.

Comparative Example 2

An outer casing material for a battery of Comparative Example 2 was manufactured similar to Example 1, except that a single unstretched polypropylene film having a thickness of 80 µm was prepared as an inner layer by molding the material of the base material layer of Example 1 by the T-die shaping method.

TABLE 2

|  |  | Range | PP-1 | PP-2 | PP-3 |
|---|---|---|---|---|---|
| A: Propylene component | Ethylene content (% by mass) | — | 0 | 0 | 5.5 |
|  | Content within resin composition (% by mass) | 50 to 80 | 70 | 75 | 80 |
| B: Copolymer component | Polymerization unit (% by mass) | 50 to 85 | 70 | 65 | 75 |
|  | Content within resin composition (% by mass) | 20 to 50 | 30 | 25 | 20 |
| Resin composition | Melt flow rate (g/10 minutes) | 0.1 to 15.0 | 1.2 | 1.0 | 2.7 |
|  | Content of xylene-soluble component Xs (% by mass) |  | 29.6 | 23 | 27.6 |
| Xylene-insoluble component Xi | Limiting viscosity [η] Xs (dL/g) |  | 3.6 | 3.5 | 2.9 |
|  | Refractive index | 1.490 to 1.510 | 1.503 | 1.503 | 1.498 |
| Xylene-soluble component Xs | Limiting viscosity [η] Xs (dL/g) | 1.4 to 5 | 3.3 | 3.6 | 2.1 |
|  | Propylene content Pp of high propylene content component (% by mass) | 60 to 95 | 81.8 | 80.5 | 89 |
|  | Propylene content P'p of low propylene content component (% by mass) | 20 to 60 | 36.7 | 42.4 | 44.5 |
|  | (Pp/P'p) | ≥1.9 | 2.23 | 1.90 | 2.00 |
|  | Pf1/(1 − Pf1) | 2.00 to 6.00 | 4.72 | 3.22 | 6.45 |
|  | Refractive index | 1.470 to 1.490 | 1.479 | 1.479 | 1.488 |
|  | Propylene content (% by mass) | 50 to 80 | 73.9 | 71.5 | 83 |
|  | [η] Xs/[η] Xi | 0.7 to 1.5 | 0.92 | 1.03 | 0.72 |

Example 2

An outer casing body for a battery of Example 2 was manufactured in the same manner as Example 1, except that an unstretched polypropylene film was prepared using PP-2 shown in Table 2, wherein the PP-2 was a film-like resin composition (base material layer), as a base material layer of an inner layer.

Comparative Example 3

An outer casing material for a battery of Comparative Example 3 was manufactured similar to Example 1, except that a single unstretched polypropylene film having a thickness of 80 µm was prepared as an inner layer by molding the material of the sealant layer of Example 1 by the T-die shaping method.

Insulation properties of the inner layer were evaluated using the evaluation method described below with respect to the outer casing materials for a battery obtained in Examples 1 to 3 and Comparative Examples 1 to 3 obtained as described above. The evaluation results are shown in Table 3.

FIGS. 5 to 9 are explanation figures which explain the evaluation method of the outer casing materials for a battery.

TABLE 3

| | Inner layer | | Insulation resistance (n = 5) |
|---|---|---|---|
| | Base material layer | Sealant layer | (MΩ) |
| Example 1 | PP-1 | rPP-1 | >200 MΩ |
| | | | >200 MΩ |
| | | | >200 MΩ |
| | | | >200 MΩ |
| | | | >200 MΩ |
| Example 2 | PP-2 | rPP-1 | >200 MΩ |
| | | | >200 MΩ |
| | | | >200 MΩ |
| | | | >200 MΩ |
| | | | >200 MΩ |
| Example 3 | PP-1 | rPP-2 | >200 MΩ |
| | | | >200 MΩ |
| | | | >200 MΩ |
| | | | >200 MΩ |
| | | | >200 MΩ |
| Comparative Example 1 | PP-3 | rPP-1 | 100 |
| | | | 10 |
| | | | 30 |
| | | | 10 |
| | | | 50 |
| Comparative Example 2 | PP-1 | PP-1 | 1.5 |
| | | | 1.1 |
| | | | 18 |
| | | | 1.2 |
| | | | 0.9 |
| Comparative Example 3 | rPP-1 | rPP-1 | 0.2 |
| | | | 0.2 |
| | | | 0.2 |
| | | | 0.2 |
| | | | 0.2 |

(1) Preparation of Test Cell for Insulation Evaluation

Figure 5:
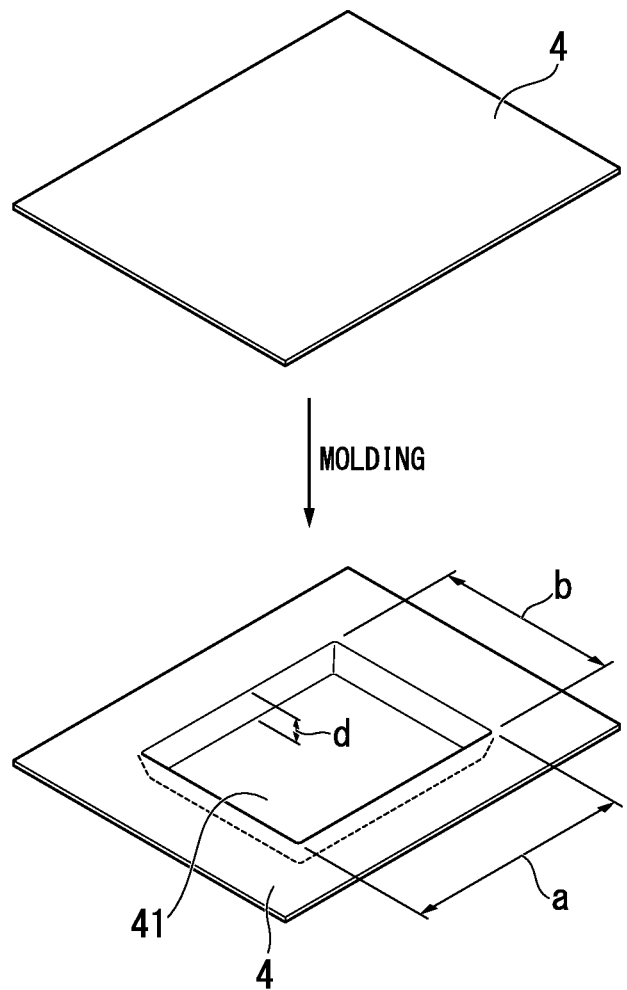
FIG. 5 is a view which explains the evaluation method of an outer casing material for a battery.

As shown in FIG. 5, concave portions 41 of a size of 5 cm (length a)×3.25 cm (width b)×5.5 cm (depth d) were formed by deep drawing with respect to the outer casing materials for a battery 4 of Examples 1 to 3 and Comparative Examples 1 to 3. Then, trimming of a periphery of the concave portions 41 was performed to obtain the outer casing materials for a battery 4 wherein the outer shape thereof was a rectangle having a size of 9.5 cm (length)×6.5 cm (width).

Figure 6:
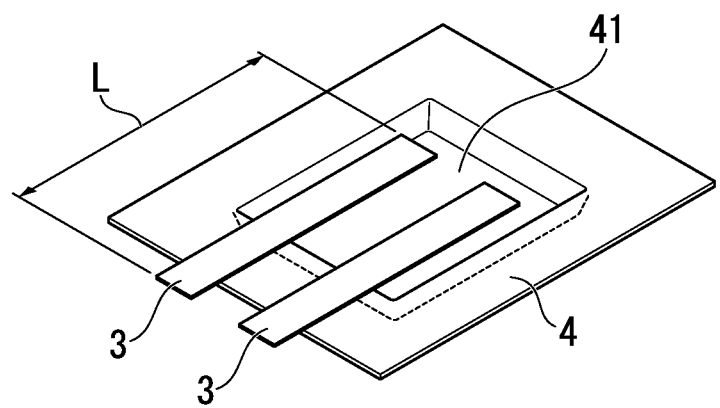
FIG. 6 is a view which explains the evaluation method of an outer casing material for a battery.

Next, as shown in FIG. 6, each of the outer casing materials for a battery 4 of Examples 1 to 3 and Comparative Examples 1 to 3, to which the concave portions 41 had been formed and trimming had been performed, and each of untreated outer casing materials for a battery 4 of Examples 1 to 3 and Comparative Examples 1 to 3, to which concave portions 41 had not been formed, were laminated so that the inner layers 8 were located inside, and two tab leads 3 which had the length L of 9 cm (manufactured by Nets Inc) were put between the laminated casing materials. Then, heat-sealing was performed for three sides of the laminated rectangular outer casing materials for a battery 4 to obtain a shape of a bag due to heat-sealing of the inner layers 8, and an outer casing body for a battery 2 shown in FIG. 7 was obtained.

As a heat sealer, TP-701-A manufactured by Tester Sangyo Co., Ltd. was used.

Figure 7:
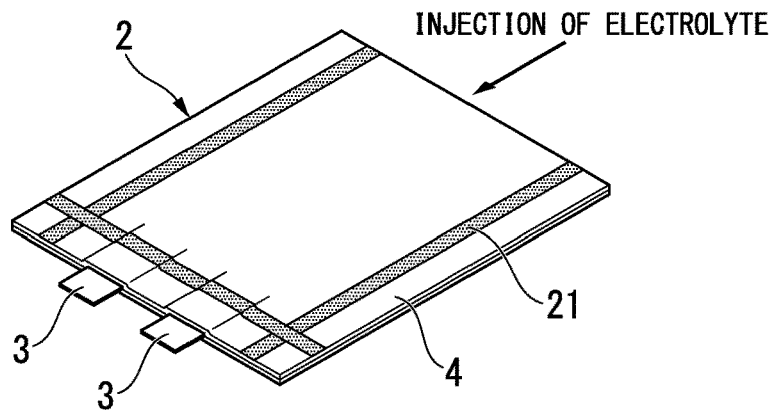
FIG. 7 is a view which explains the evaluation method of an outer casing material for a battery.

The heat-sealing conditions were set to be a temperature of 200° C., pressure of 0.2 MPa and heating time of 6 seconds. As shown in FIG. 7, heat-sealing was performed so that the distance between an outer edge portion of the outer casing body for a battery 2 and the edge of the heat-sealed portion 21 was 1 cm.

Next, as shown in FIG. 7, 7.5 ml of an electrolytic solution was injected in the outer casing body for a battery 2. Here, as the electrolytic solution, an electrolytic solution manufactured by Kishida Chemical Co., Ltd. was used wherein $LiPF_6$ having a concentration of 1 M was set to be a solute, and a mixed solution of ethylene carbonate:diethyl carbonate=1:1 (volume ratio) was set to be a solvent.

Figure 8:
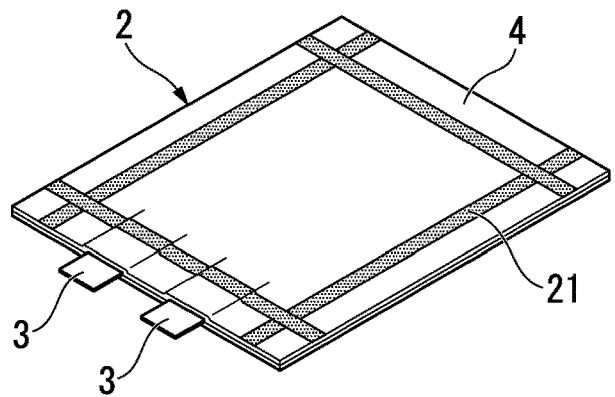
FIG. 8 is a view which explains the evaluation method of an outer casing material for a battery.

Subsequently, as shown in FIG. 8, an opening which was an unsealed side of the rectangular outer casing materials for a battery 4 was heat-sealed to complete sealing.

Figure 9:
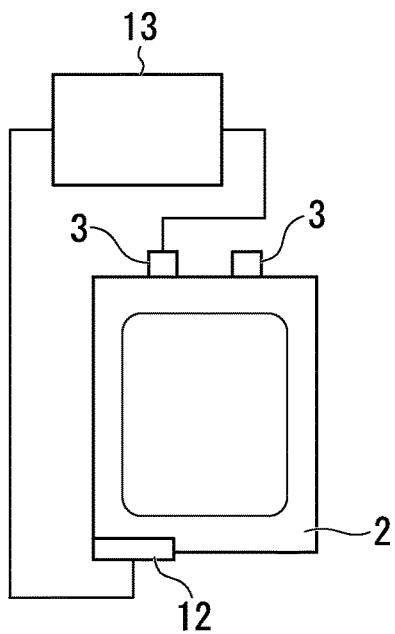
FIG. 9 is a view which explains the evaluation method of an outer casing material for a battery.

Then, a carbon tape 12 for SEM manufactured by Nisshin EM Corporation was attached to the metal foil layer 10 exposed at the end face of the outer casing body for a battery 2 wherein the end face existed at the counter side to the side where the tab lead 3 of had been inserted, and test cells of Examples 1 to 3 and Comparative Examples 1 to 3 as shown in FIG. 9 were obtained.

Here, the carbon tape 12 was attached for the purpose of increasing a contact surface between the metal foil layer 10 of the outer casing body for a battery 2 and a measuring device 13 used for evaluating insulation properties and performing stable measurement of resistance.

For each of Examples 1 to 3 and Comparative Examples 1 to 3, five test cells were manufactured and evaluated. In the test cells of Examples 1 to 3 and Comparative Examples 1 to 3, an internal circuit was formed by the tab lead 3/the electrolytic solution/the inner layer/the adhesive layer/the metal foil layer/the carbon tape 12.

(2) Insulation Evaluation

As shown in FIG. 9, conducting wires were connected to each of the tab lead 3 and the carbon tape 12, and an insulation resistance tester 3154 (manufactured by Hioki E.E. Corporation) was set as a measuring device 13 between the conducting wire connected to the tab lead 3 and the conducting wire connected to the carbon tape 12. Measurement of resistance between the tab lead 3 and the carbon tape 12 was performed under the conditions that a measurement range was set to be 200 MΩ, voltage applied between the tab lead 3 and the carbon tape 12 was set to be 25 V and an application time was set to be 10 seconds.

(3) Evaluation Results

As shown in Table 3, all test cells of Examples 1 to 3 showed resistance values of 200 MΩ or more. On the other hand, Comparative Example 1 wherein the base material layer of the inner layer was not included in the limitation of the present invention, Comparative Example 2 wherein a sealant layer was not included and Comparative Example 3 wherein a base material layer was not included showed resistance values of 100 MΩ or less.

The results showed that the base material layer of the inner layer of the outer casing material for a battery of the present invention is excellent in insulation properties, and it is presumed that excellent heat-sealing properties and excellent insulation properties are obtained since the inner layer includes the base material layer and the heat-sealant layer.

DESCRIPTION OF THE REFERENCE SIGNS

1: Lithium secondary battery
2: Outer casing for a battery
3: Tab lead 4: Outer casing material for a battery
5: Adhesive layers
7: Electrolyte
8: Inner layer
8a: Based material layer
8b: Sealant layer
8c: Covering layer
10: Metal foil layer,
11: Outer layer
12: Carbon tape
13: Measuring device
14: Separator
15: Positive electrode mixed material
16: Positive current collector
17: Negative electrode mixed material
18: Negative current collector
81: Inner layer
82: Inner layer

The invention claimed is:

1. An outer casing material for a battery, comprising:
an outer layer comprising a heat-resistant resin film;
a first adhesive layer stacked on the outer layer in a stacking direction;
a metal foil layer stacked on the first adhesive layer in the stacking direction to sandwich the first adhesive layer between the outer layer and the metal foil layer;
a second adhesive layer stacked on the metal foil layer in the stacking direction; and
an inner layer stacked on the second adhesive layer in the stacking direction and made of a thermoplastic resin film, the inner layer comprising:
a first sealant layer and a second sealant layer which are made from a propylene-ethylene random copolymer which has a melt flow rate in a range of 3 to 30 g/10 minutes at 230° C. and a first melting point in a range of 130° C. to 155° C., the first sealant layer being stacked on the second adhesive layer in the stacking direction to sandwich the second adhesive layer between the metal foil layer and the first sealant layer; and
a base material layer sandwiched between the first sealant layer and the second sealant layer and having a second melting point in a range of 140 to 170° C., the second melting point of the base material layer being higher than the first melting point of the first and second sealant layers, a ratio of a thickness of the base material layer to a thickness of total of the first and second sealant layers being in a range of 8:2 to 5:5, the base material layer being made of a resin composition having a melt flow rate in a range of 0.1 to 15 g/10 minutes at 230° C., a xylene-soluble component Xs of the resin composition satisfying the following (I) to (V), the resin composition comprising 50 to 80% by mass of a propylene component (A) and 50 to 20% by mass of a copolymer component (B) which is an elastomer of a copolymer of propylene and ethylene and/or α-olefin having 4 to 12 carbons and includes 50 to 85% by mass of a polymerization unit originating from propylene, wherein (I) propylene content Fp is 50 to 80% by mass,
(II) limiting viscosity [η] of the xylene-soluble component Xs is 1.4 to 5.0 dL/g,
(III) a ratio (Xs/Xi) of limiting viscosity [η] of the xylene-soluble component Xs and limiting viscosity [η] of the xylene-insoluble component Xi is 0.7 to 1.5, (IV) propylene content (Pp) of a high propylene content component is greater than or equal to 60% by mass and less than 95% by mass, and propylene content (P'p) of a low propylene content component is greater than or equal to 20% by mass and less than 60% by mass, wherein the contents are defined by a 2-site model, and
(V) a ratio (Pp/P'p) of the propylene content (Pp) of the high propylene content component and the propylene content (P'p) of the low propylene content component, which are defined by the 2-site mode, satisfies formula (1) shown below, and
a ratio (Pf1) of the high propylene content component and a ratio (1−Pf1) of the low propylene content component, which are based on the propylene content Fp of the xylene-soluble component Xs, satisfy formula (2) shown below, $$Pp/P'p \geq 1.90 \qquad (1)$$

$$2.00 < Pf1/(1-Pf1) < 6.00 \qquad (2); \text{ and}$$

the outer casing material having an insulation resistance of 200 MΩ or more between the metal foil layer and an electrolytic solution provided in an outer casing,
wherein a sheet of the outer casing material and another of the outer casing material formed to have a depth of 5.5 mm are heat-sealed so that the inner layer of the sheet and the inner layer of the another of the outer casing material are sealed to produce the outer casing in which the electrolytic solution is provided,
wherein said first and second adhesive layers are dry-lamination type adhesive layers, the first adhesive layer and the second adhesive layer being made of different materials, and
wherein the second adhesive layer is an acid-modified polyolefin-based adhesive.

2. The outer casing material for a battery according to claim 1, wherein the propylene content Fp of the xylene-soluble component Xs is in a range of 60 to 80% by mass.

3. The outer casing material for a battery according to claim 1, wherein the refractive index of the xylene-insoluble component Xi is 1.490 to 1.510, and the refractive index of the xylene-soluble component Xs is in a range of 1.470 to 1.490.

4. The outer casing material for a battery according to claim 1, wherein the inner layer is a thermoplastic resin film which is generated by a T-die molding method or inflation molding method.

5. The outer casing material for a battery according to claim 1,
wherein the melt flow rate of the base material is less than the melt flow rate of the first and second sealant layers,
wherein the melt flow rate of the sealant layers is in a range of 5 to 20 g/10 minutes at 230° C., and
wherein the melt flow rate of the base material layer is in a range of 1 to 5 g/10 minutes at 230° C.

6. The outer casing material for a battery according to claim 1, wherein the thickness of the inner layer is in a range of 20 to 100 μm.

7. The outer casing material for a battery according to claim 1, wherein the outer casing material has a concave portion formed by deep-drawing or bulging.

8. A lithium secondary battery which has the outer casing material for a battery according to claim 1.

9. The outer casing material for a battery according to claim 1, wherein the melting point of the heat-resistant resin film which constitutes the outer layer is higher than the melting point of the thermoplastic resin film which constitutes the inner layer, and the difference between the melting point of the heat-resistant resin film and the average melting point of the thermoplastic resin film constituting the inner layer is in a range of about 30° C. to 100° C.

10. The outer casing material for a battery according to claim 1, wherein the melting point of the base material layer is in a range of 150 to 165° C.

11. The outer casing material for a battery according to claim 1, wherein the melting point of the sealant layers is in a range of 135° C. to 145° C.

12. The outer casing material for a battery according to claim 1,
wherein the first adhesive layer is a urethane-based adhesive.

13. The outer casing material for a battery according to claim 1, wherein a ratio of thickness of the base material layer to that of total of the sealant layers is in a range of 8:2 to 6:4.

14. An outer casing material for a battery, wherein the casing material is formed by laminating an outer layer which is a heat-resistant resin film, a first adhesive layer, a metal foil layer, a second adhesive layer and an inner layer, which is a thermoplastic resin film, in this order;

the inner layer comprises sealant layers and a base material layer, wherein the base material layer is sandwiched between the sealant layers;
the sealant layers are made from a propylene-ethylene random copolymer wherein a melt flow rate at 230° C. thereof is in a range of 3 to 30 g/10 minutes;
a melting point of the sealant layers is in a range of 130° C. to 155° C.;
a melting point of the base material layer is in a range of 140 to 170° C.;
a melting point of the base material layer is larger than that of the sealant layers;
a ratio of thickness of the base material layer to that of total of the sealant layers is in a range of 9:1 to 2:8;
the base material layer is made of a resin composition wherein a melt flow rate at 230° C. thereof is in a range of 0.1 to 15 g/10 minutes, a xylene-soluble component Xs of the resin composition satisfies the following (I) to (V), and the resin composition comprises 50 to 80% by mass of a propylene component (A) and 50 to 20% by mass of a copolymer component (B) which is an elastomer of a copolymer of propylene and ethylene and/or α-olefin having 4 to 12 carbons and includes 50 to 85% by mass of a polymerization unit originating from propylene;
(I) propylene content Fp is 50 to 80% by mass,
(II) limiting viscosity [η] of the xylene-soluble component Xs is 1.4 to 5.0 dL/g,
(III) a ratio (Xs/Xi) of limiting viscosity [η] of the xylene-soluble component Xs and limiting viscosity [η] of the xylene-insoluble component Xi is 0.7 to 1.5,
(IV) propylene content (Pp) of a high propylene content component is greater than or equal to 60% by mass and less than 95% by mass, and propylene content (P'p) of a low propylene content component is greater than or equal to 20% by mass and less than 60% by mass, wherein the contents are defined by a 2-site model, and
(V) a ratio (Pp/ P'p) of the propylene content (Pp) of the high propylene content component and the propylene content (P'p) of the low propylene content component, which are defined by the 2-site mode, satisfies formula (1) shown below, and a ratio (Pf1) of the high propylene content component and a ratio (1−Pf1) of the low propylene content component, which are based on the propylene content Fp of the xylene-soluble component Xs, satisfy formula (2) shown below, $$Pp/P'p \geq 1.90 \quad (1)$$

$$2.00 < Pf1/(1-Pf1) < 6.00 \quad (2); \text{ and}$$

the outer casing material having an insulation resistance of 200 MΩ or more between the metal foil layer and an electrolytic solution provided in an outer casing,
wherein a sheet of the outer casing material and another of the outer casing material formed to have a depth of 5.5 mm are heat-sealed so that the inner layer of the sheet and the inner layer of the another of the outer casing material are sealed to produce the outer casing in which the electrolytic solution is provided,
wherein said first and second adhesive layers are dry-lamination type adhesive layers, the first adhesive layer and the second adhesive layer being made of different materials, and
wherein the second adhesive layer is an acid-modified polyolefin-based adhesive.

15. An outer casing material for a battery, wherein the casing material is formed by laminating an outer layer which is a heat-resistant resin film, a first adhesive layer, a metal foil layer, a second adhesive layer and an inner layer, which is a thermoplastic resin film, in this order;

the inner layer comprises at least a sealant layer and a base material layer, wherein the sealant layer of the inner layer is positioned as a surface on the opposite side to the metal foil layer;
the sealant layer is made from a propylene-ethylene random copolymer wherein a melt flow rate at 230° C. thereof is in a range of 3 to 30 g/10 minutes;
a melting point of the sealant layer is in a range of 130° C. to 155° C.;
a melting point of the base material layer is in a range of 140 to 170° C.;
a melting point of the base material layer is larger than that of the sealant layer;
a ratio of thickness of the base material layer to that of the sealant layer is in a range of 8:2 to 5:5;
the base material layer is made of a resin composition wherein a melt flow rate at 230° C. thereof is in a range of 0.1 to 15 g/10 minutes, a xylene-soluble component Xs of the resin composition satisfies the following (I) to (V), and the resin composition comprises 50 to 80% by mass of a propylene component (A) and 50 to 20% by mass of a copolymer component (B) which is an elastomer of a copolymer of propylene and ethylene and/or α-olefin having 4 to 12 carbons and includes 50 to 85% by mass of a polymerization unit originating from propylene;
(I) propylene content Fp is 50 to 80% by mass,
(II) limiting viscosity [η] of the xylene-soluble component Xs is 1.4 to 5.0 dL/g,
(III) a ratio (Xs/Xi) of limiting viscosity [η] of the xylene-soluble component Xs and limiting viscosity [η] of the xylene-insoluble component Xi is 0.7 to 1.5,
(IV) propylene content (Pp) of a high propylene content component is greater than or equal to 60% by mass and less than 95% by mass, and propylene content (P'p) of a low propylene content component is greater than or equal to 20% by mass and less than 60% by mass, wherein the contents are defined by a 2-site model, and (V) a ratio (Pp/P'p) of the propylene content (Pp) of the high propylene content component and the propylene content (P'p) of the low propylene content component, which are defined by the 2-site mode, satisfies formula (1) shown below, and a ratio (Pf1) of the high propylene content component and a ratio (1−Pf1) of the low propylene content component, which are based on the propylene content Fp of the xylene-soluble component Xs, satisfy formula (2) shown below, $$Pp/P'p \geq 1.90 \quad (1)$$

$$2.00 < Pf1/(1-Pf1) < 6.00 \quad (2); \text{ and}$$

the outer casing material having an insulation resistance of 200 MΩ or more between the metal foil layer and an electrolytic solution provided in an outer casing, wherein a sheet of the outer casing material and another of the outer casing material formed to have a depth of 5.5 mm are heat-sealed so that the inner layer of the sheet and the inner layer of the another of the outer casing material are sealed to produce the outer casing in which the electrolytic solution is provided, wherein said first and second adhesive layers are dry-lamination type adhesive layers, the first adhesive layer and the second adhesive layer being made of different materials, and wherein the second adhesive layer is an acid-modified polyolefin-based adhesive.

16. The outer casing material for a battery according to claim 15, wherein a ratio of thickness of the base material layer to that of total of the sealant layers is in a range of 8:2 to 6:4.

17. The outer casing material for a battery according to claim 15,
wherein the first adhesive layer is a urethane-based adhesive.

18. The outer casing material for a battery according to claim 14,
wherein the melt flow rate of the base material is less than the melt flow rate of the sealant layers.

19. The outer casing material for a battery according to claim 14,
wherein the first adhesive layer is a urethane-based adhesive.

20. The outer casing material for a battery according to claim 15,
wherein the melt flow rate of the base material is less than the melt flow rate of the sealant layer.

21. The outer casing material for a battery according to claim 15,
wherein the second adhesive layer is provided as a dry-laminate directly on a corona-treated surface of the base material layer.

* * * * *